(12) United States Patent
Yamamoto et al.

(10) Patent No.: US 8,283,829 B2
(45) Date of Patent: *Oct. 9, 2012

(54) AXIAL GAP MOTOR

(75) Inventors: Keiichi Yamamoto, Haga-gun (JP); Hirofumi Atarashi, Shioya-gun (JP); Shoei Abe, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 390 days.

This patent is subject to a terminal disclaimer.

(21) Appl. No.: 12/665,209

(22) PCT Filed: Jun. 11, 2008

(86) PCT No.: PCT/JP2008/060659
§ 371 (c)(1),
(2), (4) Date: Dec. 17, 2009

(87) PCT Pub. No.: WO2009/001675
PCT Pub. Date: Dec. 31, 2008

(65) Prior Publication Data
US 2010/0187933 A1 Jul. 29, 2010

(30) Foreign Application Priority Data
Jun. 26, 2007 (JP) ................. 2007-167490

(51) Int. Cl.
*H02K 1/27* (2006.01)
(52) U.S. Cl. ......... 310/156.32; 310/156.33; 310/156.36; 310/156.55; 310/156.62; 310/156.64; 310/268
(58) Field of Classification Search .......... 310/156.08–156.16, 156.23–156.45, 310/156.53, 156.56, 156.82, 268, 156.55–156.64
See application file for complete search history.

(56) References Cited

U.S. PATENT DOCUMENTS
336,087 A 2/1886 Brush
(Continued)

FOREIGN PATENT DOCUMENTS
EP 1 612 913 A2 1/2006
(Continued)

OTHER PUBLICATIONS
International Search Report of PCT/JP2008/060659, mailing date of Sep. 2, 2008.
(Continued)

*Primary Examiner* — Tran Nguyen
(74) *Attorney, Agent, or Firm* — Westerman, Hattori, Daniels & Adrian, LLP (57) ABSTRACT

There is provided an axial gap motor including a rotor rotatable around a rotation axis; and a first stator and a second stator arranged to face each other with the rotor therebetween from both sides of the rotor in the rotation axis direction of the rotor, wherein the rotor includes a plurality of main permanent magnets having magnetizing directions in the rotation axis direction of the rotor and arranged in a peripheral direction of the rotor; a partition member arranged between the main permanent magnets which are adjacent to each other in the peripheral direction of the rotor, the partition member including a nonmagnetic material; and auxiliary permanent magnets having a magnetizing direction that is orthogonal both to the rotation axis direction of the rotor and a radial direction of the rotor, and arranged on both sides of the partition member in the rotation axis direction of the rotor.

4 Claims, 6 Drawing Sheets

U.S. PATENT DOCUMENTS

| | | |
|---|---|---|
| 2,154,146 A | 4/1939 | Becker |
| 2,632,861 A | 3/1953 | Morton et al. |
| 3,108,200 A | 10/1963 | Baldwin |
| 3,465,188 A | 9/1969 | Sisk |
| 3,591,819 A | 7/1971 | Laing |
| 3,762,042 A | 10/1973 | Abe et al. |
| 3,956,651 A | 5/1976 | Brammerlo |
| 4,007,387 A | 2/1977 | Rustecki |
| 4,095,150 A | 6/1978 | Senckel |
| 4,339,874 A | 7/1982 | Mc'Carty et al. |
| 4,363,988 A | 12/1982 | Kliman |
| 4,410,820 A | 10/1983 | Stanley |
| 4,658,165 A | 4/1987 | Vanderschaeghe |
| 4,864,175 A | 9/1989 | Rossi |
| 4,996,457 A | 2/1991 | Hawsey et al. |
| 5,142,179 A | 8/1992 | Nakamura et al. |
| 5,245,238 A | 9/1993 | Lynch et al. |
| 5,334,899 A | 8/1994 | Skybyk |
| 5,387,854 A | 2/1995 | McCleer et al. |
| 5,394,321 A | 2/1995 | McCleer et al. |
| 5,397,953 A | 3/1995 | Cho |
| 5,642,009 A | 6/1997 | McCleer et al. |
| 5,671,524 A | 9/1997 | Damsky et al. |
| 5,731,649 A | 3/1998 | Caamano |
| 5,757,108 A | 5/1998 | Suzuki |
| 5,907,210 A | 5/1999 | Chaix |
| 5,925,965 A | 7/1999 | Li et al. |
| 5,955,809 A | 9/1999 | Shah |
| 6,034,459 A | 3/2000 | Matsunobu et al. |
| 6,078,121 A * | 6/2000 | Poag et al. ............. 310/91 |
| 6,373,162 B1 | 4/2002 | Liang et al. |
| 6,739,034 B2 | 5/2004 | Suzuki et al. |
| 6,809,453 B2 | 10/2004 | Narita et al. |
| 6,919,663 B2 | 7/2005 | Iles-Klumpner |
| 6,960,860 B1 | 11/2005 | DeCristofaro et al. |
| 6,995,494 B2 | 2/2006 | Haugan et al. |
| 7,144,468 B2 | 12/2006 | Decristofaro et al. |
| 7,230,359 B2 | 6/2007 | Iles-Klumpner |
| 7,230,361 B2 | 6/2007 | Hirzel |
| 7,315,102 B2 | 1/2008 | Minagawa |
| 7,355,311 B2 | 4/2008 | Shimizu |
| 7,679,260 B2 * | 3/2010 | Yamamoto et al. ........ 310/268 |
| 7,737,594 B2 | 6/2010 | Abe et al. |
| 7,906,883 B2 * | 3/2011 | Abe ................. 310/156.64 |
| 7,977,843 B2 * | 7/2011 | Atarashi et al. ........ 310/216.074 |
| 8,040,008 B2 * | 10/2011 | Kawamura et al. ...... 310/156.32 |
| 8,049,389 B2 * | 11/2011 | Abe et al. ............ 310/156.62 |
| 2004/0070307 A1 | 4/2004 | Haugan et al. |
| 2005/0194855 A1 | 9/2005 | Hasebe et al. |
| 2005/0285467 A1 | 12/2005 | Shimizu |
| 2006/0028093 A1 | 2/2006 | Minagawa et al. |
| 2006/0238056 A1 | 10/2006 | Alvarez et al. |
| 2006/0273676 A1 | 12/2006 | Naruse et al. |
| 2006/0284507 A1 | 12/2006 | Murakami |
| 2007/0018520 A1 | 1/2007 | Kaneko et al. |
| 2007/0080598 A1 | 4/2007 | Naruse |
| 2007/0170802 A1 | 7/2007 | Potoradi |
| 2008/0129136 A1 | 6/2008 | Abe et al. |
| 2008/0290752 A1 | 11/2008 | Yamamoto et al. |
| 2009/0243422 A1 | 10/2009 | Atarashi et al. |
| 2009/0251021 A1 | 10/2009 | Atarashi et al. |
| 2009/0295245 A1 | 12/2009 | Abe et al. |
| 2009/0295246 A1 | 12/2009 | Abe |
| 2010/0090555 A1 | 4/2010 | Tajima et al. |
| 2010/0117474 A1 | 5/2010 | Atarashi et al. |
| 2010/0141075 A1 | 6/2010 | Atarashi et al. |
| 2010/0187933 A1 | 7/2010 | Yamamoto et al. |
| 2010/0219710 A1 | 9/2010 | Kawamura et al. |
| 2010/0231079 A1 | 9/2010 | Abe et al. |
| 2011/0285237 A1 * | 11/2011 | Amari et al. ......... 310/156.07 |

FOREIGN PATENT DOCUMENTS

| | | |
|---|---|---|
| EP | 1734645 A2 | 12/2006 |
| EP | 1 850 451 A1 | 10/2007 |
| JP | 55053161 A | 4/1980 |
| JP | 59144352 A | 8/1984 |
| JP | 59-230453 A | 12/1984 |
| JP | 62-078073 U | 5/1987 |
| JP | 02-079174 U | 6/1990 |
| JP | 6-500457 A | 1/1994 |
| JP | 06-205554 A | 7/1994 |
| JP | 9-168263 A | 6/1997 |
| JP | 10164779 A | 6/1998 |
| JP | 10-271784 A | 10/1998 |
| JP | 3062085 U | 6/1999 |
| JP | 11299199 A | 10/1999 |
| JP | 11511948 T | 10/1999 |
| JP | 2000-197301 A | 7/2000 |
| JP | 2000-262026 A | 9/2000 |
| JP | 2001-057753 A | 2/2001 |
| JP | 2001-136721 A | 5/2001 |
| JP | 2001-251817 A | 9/2001 |
| JP | 2002-112481 A | 4/2002 |
| JP | 2004-056974 A | 2/2004 |
| JP | 2005-94955 A | 4/2005 |
| JP | 2005-143288 A | 6/2005 |
| JP | 2005-269778 A | 9/2005 |
| JP | 2005-304245 A | 10/2005 |
| JP | 2005-318782 A | 11/2005 |
| JP | 2005-341696 A | 12/2005 |
| JP | 2006-025482 A | 1/2006 |
| JP | 2006-166635 A | 6/2006 |
| JP | 2006-222131 A | 8/2006 |
| JP | 2006-527578 A | 11/2006 |
| JP | 2006-345627 A | 12/2006 |
| JP | 2007-028868 A | 2/2007 |
| JP | 2007-037210 A | 2/2007 |
| JP | 2007-053844 A | 3/2007 |
| JP | 2007-089270 A | 4/2007 |
| JP | 2007-104819 A | 4/2007 |
| JP | 2007-151321 A | 6/2007 |
| JP | 2007-215291 A | 8/2007 |
| JP | 2008-022663 A | 1/2008 |
| JP | 2008-048497 A | 2/2008 |
| JP | 2008-104278 A | 5/2008 |
| JP | 2008-167639 A | 7/2008 |
| WO | 92/20131 A2 | 11/1992 |
| WO | 96/29774 A1 | 9/1996 |
| WO | 2004/047255 A2 | 6/2004 |
| WO | 2004-109894 A1 | 12/2004 |
| WO | 2006/068039 A1 | 6/2006 |
| WO | 2006/077812 A1 | 7/2006 |
| WO | 2007-091727 A1 | 8/2007 |

OTHER PUBLICATIONS

Zhu, Z. Q. et al.; "Influence of Design Parameters on Cogging Torque in Permanent Magnet Machines"; IEEE Transactions on Energy Conversion, IEEE Service Center. Oiscataway, NJ, US, vol. 15, No. 4, Dec. 2000, pp. 407-412.

United States Patent and Trademark Office Action dated Mar. 29, 2011, issued in corresponding U.S. Appl. No. 12/457,106.

United States Patent and Trademark Office Action dated Apr. 11, 2011, issued in corresponding U.S. Appl. No. 12/670,601.

European Search Report dated Oct. 17, 2011, issued in corresponding European Patent Application No. 08765438.0.

European Search Report dated Oct. 17, 2011, issued in corresponding European Patent Application No. 08777992.2.

United States Patent and Trademark Office Action dated Mar. 1, 2012, issued in corresponding U.S. Appl. No. 12/517,721.

Japanese Office Action dated Dec. 13, 2011, issued in corresponding Japanese Patent Application No. 2007-223053.

* cited by examiner

AXIAL GAP MOTOR

TECHNICAL FIELD

The present invention relates to an axial gap motor.

Priority is claimed on Japanese Patent Application No. 2007-167490, filed on Jun. 26, 2007, the content of which are incorporated herein by reference.

BACKGROUND ART

Conventionally, for example, an axial-gap-type permanent magnet generator which includes a pair of stators arranged to face each other so as to sandwich a rotor from both sides in the direction of a rotation axis and which forms a magnetic flux loop via the pair of stators with respect to a field magnetic flux by the permanent magnets of the rotor is known (for example, refer to Patent Document 1).

[Patent Document 1]

Published Japanese Translation No. H 6-500457 of the PCT International Publication

DISCLOSURE OF INVENTION

Problems to be Solved by the Invention

Meanwhile, in the permanent magnet generator related to the above conventional technique, magnetic field fluxes caused by permanent magnets of a rotor are made to linearly pass through the rotor so as to sweep between a pair of stators so that the leak rate of magnetic fluxes within the rotor is reduced, and the amount of interlinking magnetic fluxes interlinking stator windings of the stators is increased.

In such a permanent magnet generator, it is desired to reduce an eddy current loss caused by armature magnetic fluxes generated during application of an electric current to the stators to improve the operating efficiency of the permanent magnet generator, and to further increase the amount of interlinking magnetic fluxes interlinking the stator windings of the stators, thereby increasing torque potential.

The present invention was made in view of the above circumstances, and the object thereof is to provide an axial gap motor capable of increasing the amount of interlinking magnetic fluxes interlinking stator windings of stators while reducing an eddy current loss generated during application of an electrical current to improve operating efficiency.

Means for Solving the Problem

The present invention has adopted the following constitutions in order to solve the above problems and achieve the relevant object.

(1) There is provided an axial gap motor including a rotor rotatable around a rotation axis; and a first stator and a second stator arranged to face each other with the rotor therebetween from both sides of the rotor in the direction of the rotation axis of the rotor. The rotor includes a plurality of main permanent magnets having magnetizing directions in the rotation axis direction of the rotor and arranged in a peripheral direction of the rotor; a partition member arranged between the main permanent magnets which are adjacent to each other in the peripheral direction of the rotor, the partition member including a nonmagnetic material; and auxiliary permanent magnets having magnetizing directions in a direction orthogonal both to the rotation axis direction of the rotor and to a radial direction of the rotor, the auxiliary permanent magnets being arranged on both sides of the partition member in the rotation axis direction of the rotor.

According to the axial gap motor of the present embodiment, the partition member including a nonmagnetic material is arranged between the main permanent magnets which are adjacent to each other in the peripheral direction. Additionally, the auxiliary permanent magnet pieces, which are magnetized in a direction orthogonal to the magnetizing direction of the main permanent magnet piece, are arranged at both ends of the partition member in the direction of the rotation axis. This way, the magnetic flux of each permanent magnet can be converged by the magnetic flux lens effect by a so-called Halbach arrangement of permanent magnets while ensuring desired rigidity as a structure. Thus, the amount of magnetic fluxes interlinked to the stator windings of the stators can be increased; torque potential can be increased; and the operating efficiency of the axial gap motor can be improved.

(2) In the above axial gap motor, the partition member may be hollow.

In this case, magnetic insulation can be improved and the magnetic flux of each permanent magnet can be efficiently converged. Along with this, an eddy current loss caused by armature magnetic fluxes generated during application of an electric current can be reduced, and a superfluous temperature rise caused by Joule heat can be prevented.

(3) In the above axial gap motor, the partition member may be formed by laminating an insulating nonmagnetic material and a non-insulating nonmagnetic material.

In this case, an eddy current loss caused by armature magnetic fluxes generated during application of an electric current can be reduced, and a superfluous temperature rise caused by Joule heat can be prevented.

(4) In the above axial gap motor, the rotor may include an inner peripheral ring arranged on inner peripheral side, and an outer peripheral ring arranged on outer peripheral side, and the inner peripheral ring and the outer peripheral ring may be arranged coaxially with each other, be combined together by the partition member, and sandwiches the main permanent magnets and the auxiliary permanent magnets from both sides in the radial direction of the rotor.

In this case, desired rigidity as a structure can be easily ensured.

BRIEF DESCRIPTION OF THE REFERENCE SYMBOLS

10: AXIAL GAP MOTOR
11: ROTOR

12: STATOR (STATOR, FIRST STATOR, SECOND STATOR)
22: TEETH
23: SLOT
34: RADIAL RIB (PARTITION MEMBER)
34a: ELECTRICALLY INSULATING NONMAGNETIC MATERIAL
34b: ELECTRICALLY NON-INSULATING NONMAGNETIC MATERIAL
35: OUTER PERIPHERAL TUBULAR PORTION (OUTER PERIPHERAL RIG)
36: INNER PERIPHERAL TUBULAR PORTION (INNER PERIPHERAL RING)
41: MAIN PERMANENT MAGNET PIECE (MAIN PERMANENT MAGNET)
43: AUXILIARY PERMANENT MAGNET PIECE (AUXILIARY PERMANENT MAGNET)

Embodiments Of The Invention

Hereinafter, one embodiment of an axial gap motor of the present invention will be described with reference to the accompanying drawings.

Figure 1:
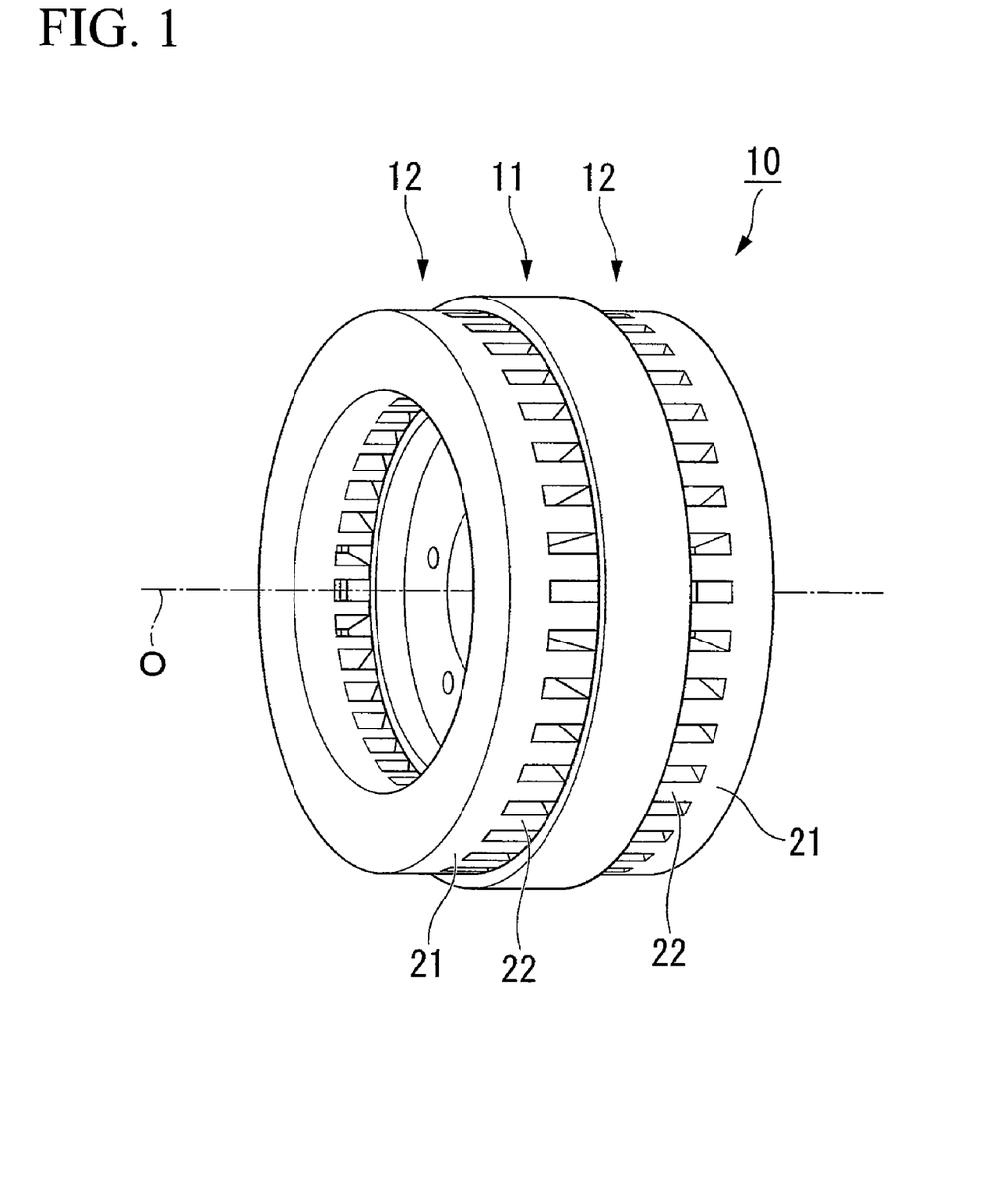
FIG. 1 is a perspective view of the axial gap motor according to one embodiment of the present invention.
Figure 2:
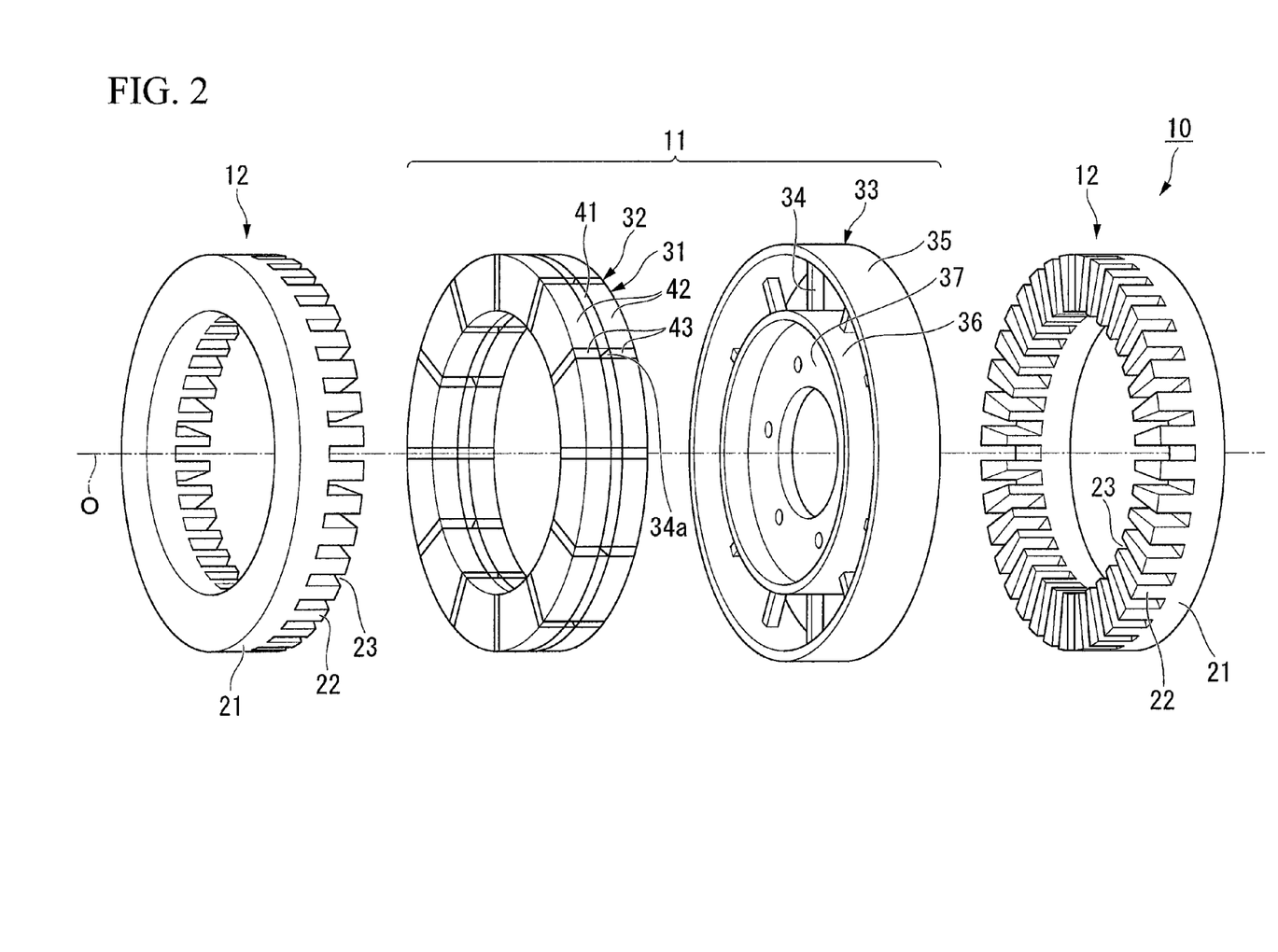
FIG. 2 is an exploded perspective view of a rotor of the axial gap motor.

As shown in, for example, FIGS. 1 and 2, the axial gap motor 10 according to the present embodiment includes a substantially annular rotor 11 rotatably provided around a rotation axis O of the axial gap motor 10, and a pair of stators 12 arranged so as to face each other such that the stators sandwich the rotor 11 from both sides in the direction of the rotation axis O, and each having stator windings of a plurality of phases which generates a rotating magnetic field which rotates the rotor 11.

The axial gap motor 10 is mounted on, for example, vehicles, such as a hybrid vehicle and an electric vehicle, as a driving source, and an output shaft of the motor is connected to an input shaft of a transmission (not shown). Thereby, the driving force of the axial gap motor 10 is transmitted to a driving wheel (not shown) of a vehicle via a transmission.

Additionally, when a driving force is transmitted to the axial gap motor 10 from the driving-wheel side during deceleration of a vehicle, the axial gap motor 10 functions as a power generator to generate a so-called regenerative braking force. Also, the axial gap motor 10 recovers the kinetic energy of a vehicle body as electrical energy (regeneration energy). Moreover, for example, in a hybrid vehicle, a rotary shaft of the axial gap motor 10 is connected to a crankshaft of an internal combustion engine (not shown). In this case, even if the output of the internal combustion engine is transmitted to the axial gap motor 10, the axial gap motor 10 functions as a power generator to generate power generation energy.

Each stator 12 includes a substantially annular plate-like yoke portion 21, a plurality of teeth 22 which protrudes toward the rotor 11 in the direction of the rotation axis O from positions with predetermined intervals in the peripheral direction on the facing surface of the yoke portion 21 which faces the rotor 11 and which extend in the radial direction, and stator windings mounted between the teeth 22.

Each stator 12 is, for example, a 6N type having six main poles (for example, U+, V+, W+, U−, V−, and W−). The U+, V+, and W+ of one stator 12 face the U−, V−, and W−, respectively, of the other stator 12 in the direction of the rotation axis O.

For example, in a pair of stators 12 which face each other in the direction of the rotation axis O, three teeth 22 of one stator 12 corresponding to U+, V+, and W+ poles, and three teeth 22 of the other stator 12 corresponding to, U−, V−, and W− poles face each other, respectively, in the direction of the rotation axis O. The state of application of an electrical current to the teeth 22 of one stator 12 and to the teeth 22 of the other stator 12 which face each other in the direction of the rotation axis O is brought into an inverted state at an electrical angle.

Also, the interval in the peripheral direction between the teeth 22 which are adjacent to each other in the peripheral direction, i.e., the slot width of a slot 23 which is formed between the teeth 22 which are adjacent to each other in the peripheral direction and extends in the radial direction has a predetermined constant value in the radial direction.

The rotor 11 includes a plurality of main magnet pole portions 31, a plurality of auxiliary magnet portions 32, and a rotor frame 33 made of a nonmagnetic material, and the main magnet portions 31 and the auxiliary magnet portions 32 are housed in the rotor frame 33 in a state where the main and auxiliary magnet portions are alternately arranged in the peripheral direction.

The rotor frame 33 includes an inner peripheral tubular portion 36 and an outer peripheral tubular portion 35 which are connected together by a plurality of radial ribs 34 arranged at predetermined intervals in the peripheral direction, and a connecting portion 37 which is formed in the shape of an annular plate which protrudes inward from an inner peripheral surface of the inner peripheral tubular portion 36, and is connected to an external driving shaft (for example, an input shaft of a transmission of a vehicle, etc.).

In this embodiment, since the inner peripheral tubular portion 36 of the rotor frame 33 is connected to the external driving shaft, the radial inside of the radial ribs 34 is a shaft portion side, and the radial outside of the radial ribs 34 is a rim portion side.

Figure 3:
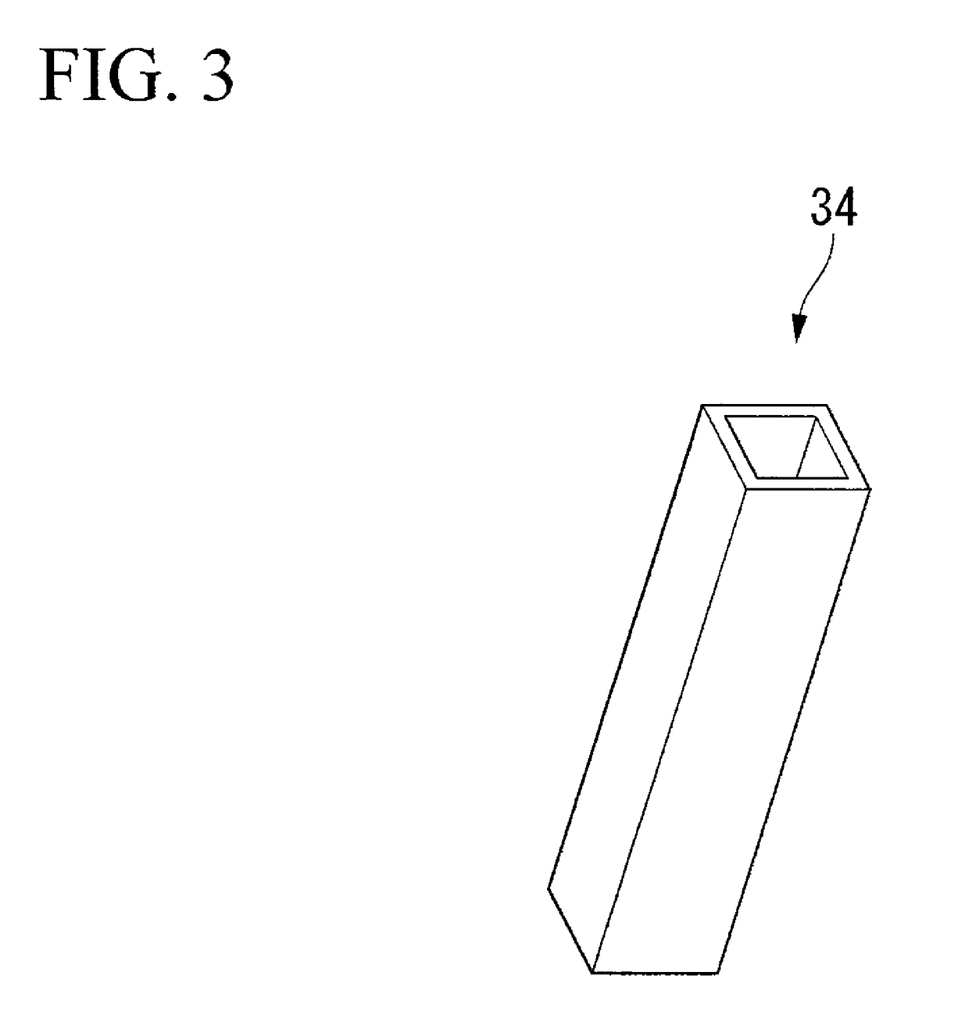
FIG. 3 is a perspective view of a radial rib of the axial gap motor.

Each radial rib 34, as shown in, for example, FIG. 3, is hollow, is formed of a nonmagnetic material, and is in the shape of a tube which extends in the radial direction.

Figure 4:
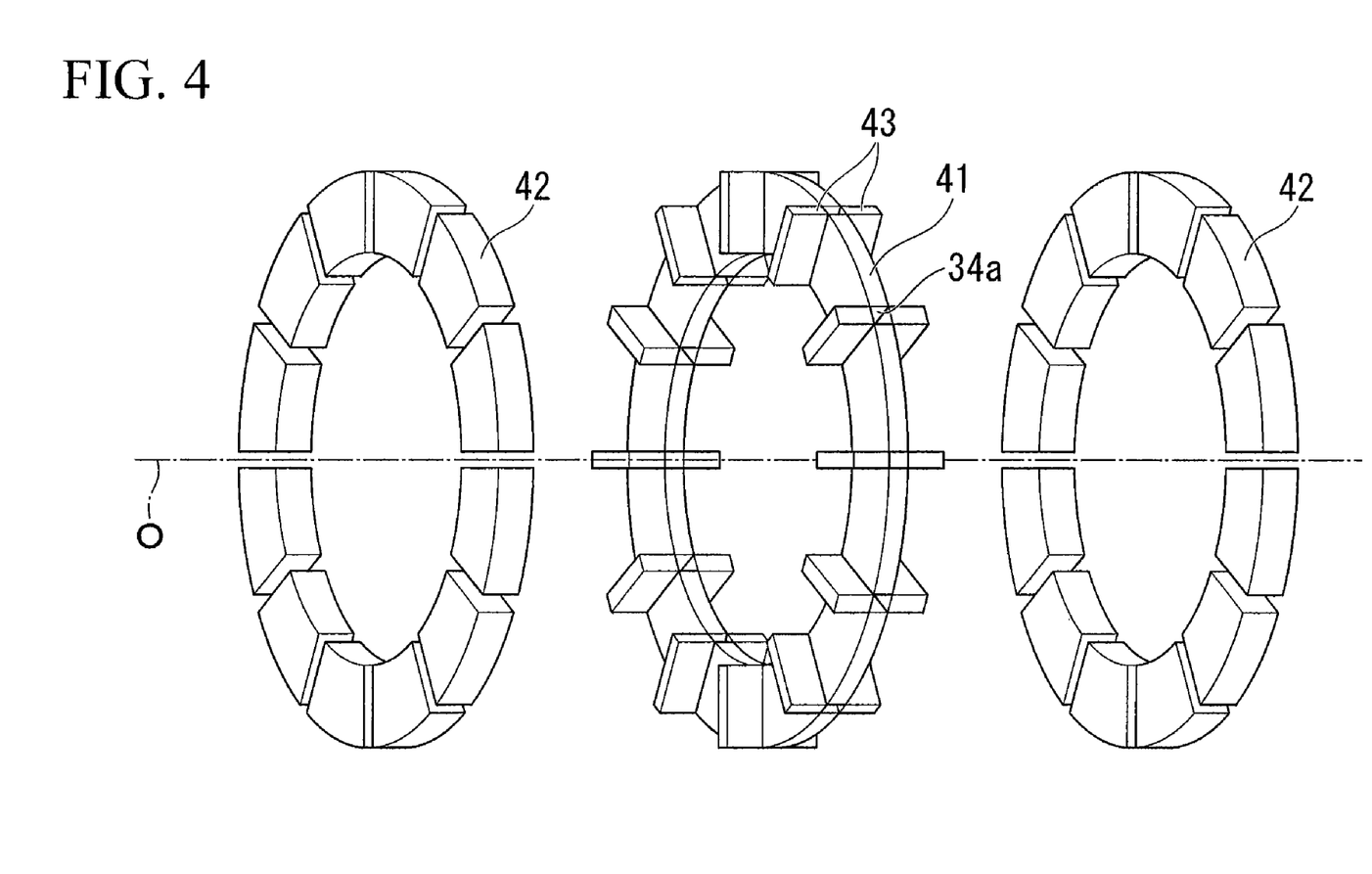
FIG. 4 is an exploded perspective view of the chief parts of the rotor of the axial gap motor.
Figure 5:
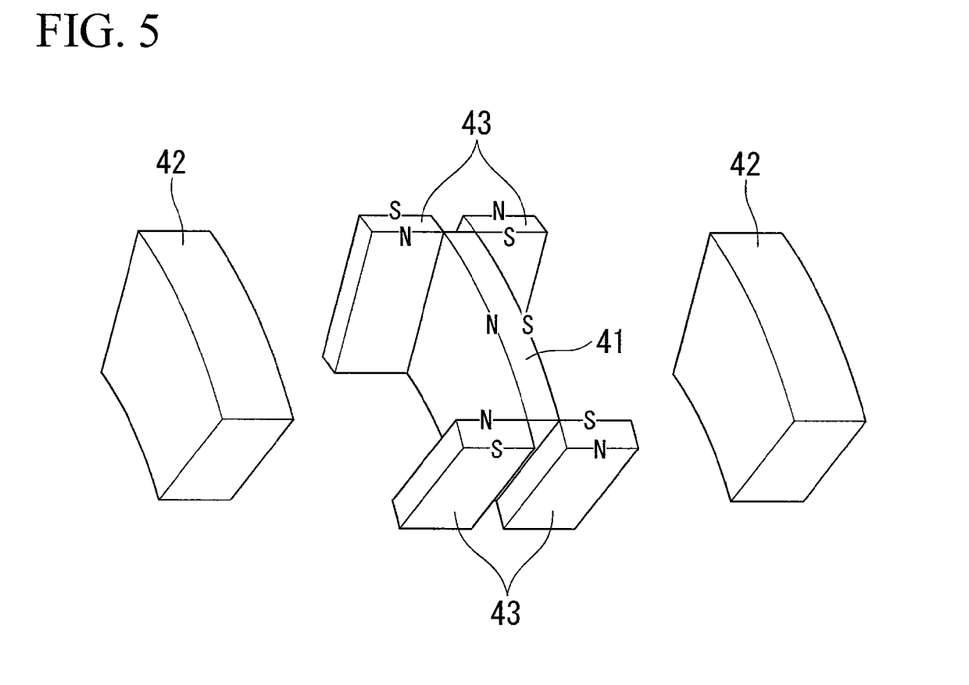
FIG. 5 is an exploded perspective view of the chief parts of the rotor of the axial gap motor.
Figure 6:
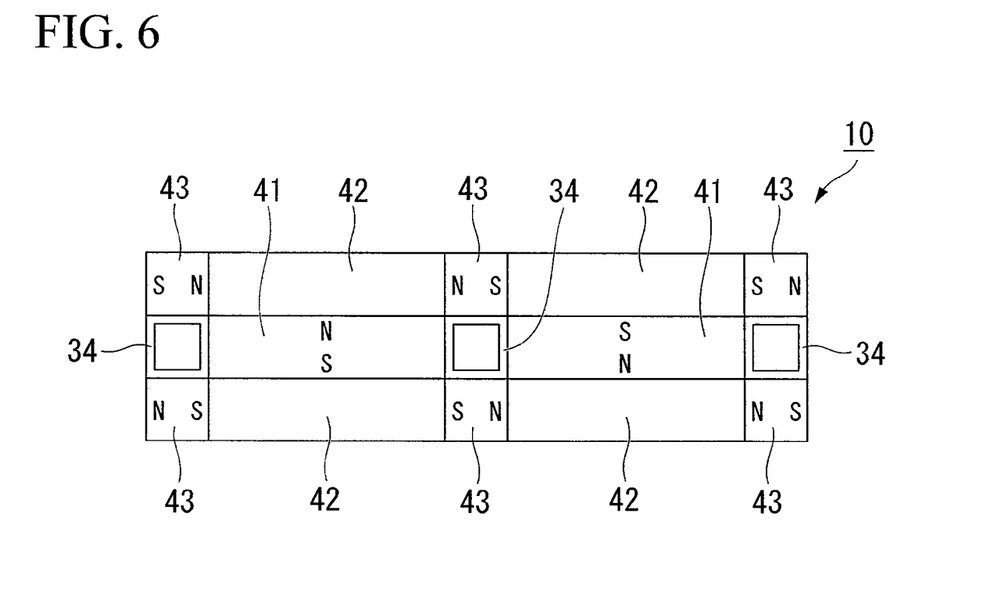
FIG. 6 is a sectional view of the chief parts with respect to the radial direction of the axial gap motor.

Each main magnet pole portion 31, as shown in, for example, FIGS. 4 to 6, includes a substantially fan-shaped plate-like main permanent magnet piece 41 magnetized, for example, in the thickness direction (that is, the direction of the rotation axis O), and a pair of fan-shaped plate-like magnetic members 42 sandwiching the main permanent magnet piece 41 from both sides in the thickness direction. The main permanent magnet pieces 41 of the main magnet pole portions 31 which are adjacent to each other in the peripheral direction, as shown in, for example, FIG. 6, have magnetizing directions which are different from each other.

The plurality of main magnet pole portions 31 housed within the rotor frame 33 are sandwiched from both sides in the radial direction by the inner peripheral tubular portion 36 and the outer peripheral tubular portion 35, and are adjacent to each other via the radial ribs 34 in the peripheral direction.

That is, the main permanent magnet piece 41 of each main magnet pole portion 31 is sandwiched from both sides in the peripheral direction by two radial ribs 34 within the rotor frame 33.

Each auxiliary magnet portion 32 includes, for example, a pair of auxiliary permanent magnet pieces 43 which sandwich the radial rib 34 from both sides in the direction of the rotation axis O within the rotor frame 33. Each of the auxiliary permanent magnet pieces 43, as shown in, for example, FIGS. 5 and 6, are magnetized along a direction (substantially peripheral direction) that is perpendicular to both of the rotation axis O direction and the radial direction. A pair of auxiliary permanent magnet pieces 43 which face each other in the direction of the rotation axis O have magnetizing directions which are different from each other.

Also, within the rotor frame 33, the auxiliary permanent magnet pieces 43 of the auxiliary magnet portions 32 which are adjacent to each other in the peripheral direction sandwich the magnetic member 42 of the main magnet pole portion 31 from both sides in the peripheral direction.

In addition, among components of the rotor 11, the rotor frame 33 and the other elements (that is, the main magnet pole portions 31 and the auxiliary magnet portion 32) are shown in a separated manner in FIG. 2. Additionally, among components of the rotor 11, only elements other than the rotor frame 33 (that is, the main magnet pole portions 31 and the auxiliary magnet portion 32) are shown in FIG. 4. FIGS. 2 and 4 show a space portion 34a in which the radial rib 34 of the rotor frame 33 is arranged. The space portion 34a is formed between a pair of auxiliary permanent magnet pieces 43 which face each other in the direction of the rotation axis O and between two main permanent magnet pieces 41 and 41 which are adjacent to each other in the peripheral direction.

A pair of auxiliary permanent magnet pieces 43 which face each other in the peripheral direction via the magnetic member 42, as shown in, for example, FIGS. 5 and 6, have magnetizing directions which are different from each other.

Also, a pair of auxiliary permanent magnet pieces 43 arranged on one side in the direction of the rotation axis O are arranged such that the same poles as the pole on the same one side of the main permanent magnet piece 41 magnetized in the direction of the rotation axis O are made to face each other. Also, a pair of auxiliary permanent magnet pieces 43 arranged on the other side in the direction of the rotation axis O are arranged such that the same poles as the pole on the same other side of the main permanent magnet piece 41 magnetized in the direction of the rotation axis O are made to face each other.

Here, the above configuration will be described in other terms. For example, first, attention is paid to the N-pole side of the main permanent magnet piece 41 in the direction of the rotation axis O, in which an N-pole is given on one side in the direction of the rotation axis O, and an S pole is given on the other side. Here, a pair of auxiliary permanent magnet pieces 43 which sandwich the magnetic member 42 touching this N-pole side, from both sides in the peripheral direction are arranged such that N poles face each other in the peripheral direction. On the other hand, an S pole is given on the other side of the main permanent magnet piece 41 in the direction of the rotation axis O. A pair of auxiliary permanent magnet pieces 43 which sandwich the magnetic member 42 touching this S-pole side, from both sides in the peripheral direction are arranged such that S poles face each other in the peripheral direction.

Thereby, the magnetic flux lens effect by a so-called Halbach arrangement of permanent magnets is obtained. As a result, the magnetic flux of the main permanent magnet piece 41 and the magnetic flux of each auxiliary permanent magnet piece 43 are converged, and the effective magnetic fluxes interlinked to each stator 12 increase relatively.

As described above, according to the axial gap motor 10 by this embodiment, each hollow radial rib 34 made of a nonmagnetic material is arranged between the permanent magnet pieces 41 which are adjacent to each other in the peripheral direction. Additionally, the auxiliary permanent magnet pieces 43, which are magnetized in a direction orthogonal to the magnetizing direction of the main permanent magnet piece 41, are arranged at both ends of the radial rib 34 in the direction of the rotation axis. This can ensure desired rigidity as a structure and can improve magnetic insulation. Additionally, this produces a magnetic flux lens effect by a so-called Halbach arrangement of permanent magnets. For this reason, the magnetic flux of each permanent magnet can be efficiently converged, and the amount of magnetic fluxes interlinked to the stator windings of each stator 12 can be increased. Along with this, an eddy current loss caused by armature magnetic fluxes generated during application of an electric current can be reduced, torque potential can be increased, a superfluous temperature rise caused by Joule heat can be prevented, and the operating efficiency of the axial gap motor 10 can be improved.

Figure 7:
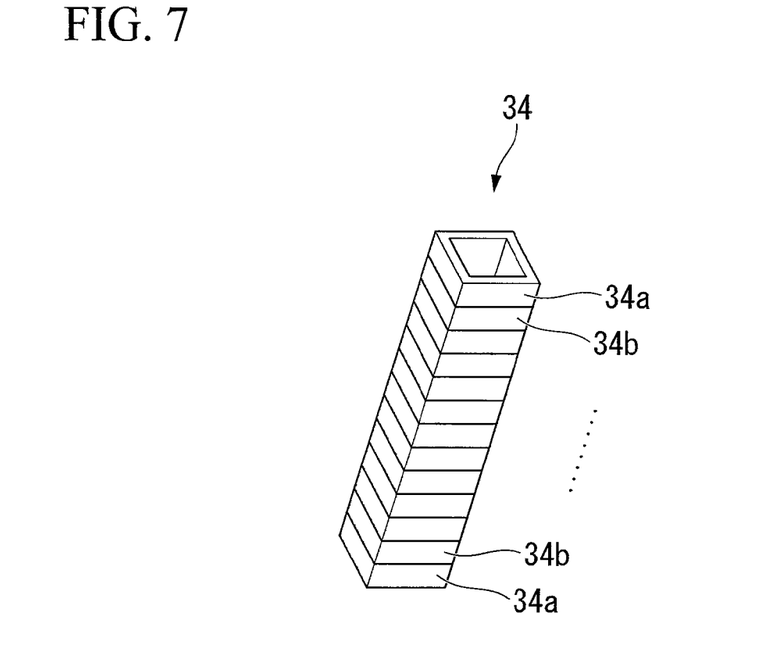
FIG. 7 is a perspective view of a radial rib of an axial gap motor according to a first modified example of one embodiment of the present invention.

In addition, in the above-described embodiment, the radial ribs 34 are formed in a hollow shape from a nonmagnetic material. However, the present invention is not limited thereto. For example, as shown in FIG. 7, each radial rib 34 may be formed by laminating an insulating nonmagnetic material and a non-insulating nonmagnetic material. In a first modified example shown in FIG. 7, a tubular radial rib 34 is formed such that a non-insulating metal-based annular nonmagnetic material (for example, copper) 34a and an annular insulating nonmagnetic material 34b are alternately laminated in the radial direction.

According to this first modified example, the radial rib 34 is formed as a laminate in which the non-insulating nonmagnetic material 34a and the insulating nonmagnetic material 34b are laminated. This can further reduce an eddy current loss caused by armature magnetic fluxes generated during application of an electric current, and can prevent a superfluous temperature rise caused by Joule heat.

Additionally, although the radial ribs 34 are formed in a hollow shape in this first modified example, the invention is not limited to this configuration. In a case where each radial rib 34 is formed by laminating an insulating nonmagnetic material and a non-insulating nonmagnetic material, the radial rib 34 may be formed in the shape of a column which extends in the radial direction, for example, as in a second modified example shown in FIG. 8. In the second modified example, a non-insulating metal-based plate-like nonmagnetic material (for example, copper) 34a and an electrically insulating plate-like nonmagnetic material 34b are alternately laminated in the radial direction in the columnar radial rib 34.

Figure 8:
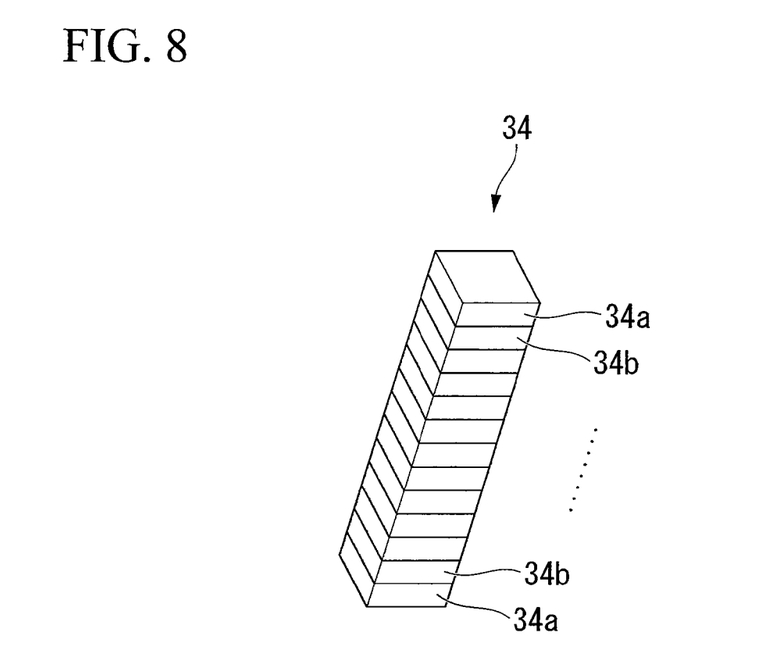
FIG. 8 is a perspective view of a radial rib of an axial gap motor according to a second modified example of one embodiment of the present invention.

According to this second modified example, the columnar radial rib 34 is formed by laminating the non-insulating nonmagnetic material 34a and the insulating nonmagnetic material 34b. This can improve desired rigidity as the structure can be improved while suppressing the occurrence of an eddy current loss caused by armature magnetic fluxes during application of an electrical current.

Industrial Applicability

According to the axial gap motor of the present embodiment, the partition member including a nonmagnetic material is arranged between the main permanent magnets which are adjacent to each other in the peripheral direction. Additionally, the auxiliary permanent magnet pieces, which are magnetized in a direction orthogonal to the magnetizing direction of the main permanent magnet piece, are arranged at both ends of the partition member in the direction of the rotation axis. This way, the magnetic flux of each permanent magnet can be converge by the magnetic flux lens effect by a so-called Halbach arrangement of permanent magnets while ensuring desired rigidity as a structure. This can increase the amount of magnetic fluxes interlinked to the stator windings of the stators, can increase torque potential, and can improve the operating efficiency of the axial gap motor.

The invention claimed is:
1. An axial gap motor comprising:
a rotor rotatable around a rotation axis; and
a first stator and a second stator arranged to face each other with the rotor therebetween from both sides of the rotor in the rotation axis direction of the rotor, wherein the rotor includes a plurality of main permanent magnets having magnetizing directions in the rotation axis direction of the rotor and arranged in a peripheral direction of the rotor;

a partition member arranged between the main permanent magnets which are adjacent to each other in the peripheral direction of the rotor, the partition member including a nonmagnetic material; and auxiliary permanent magnets having a magnetizing direction that is orthogonal both to the rotation axis direction of the rotor and a radial direction of the rotor, and arranged on both sides of the partition member in the rotation axis direction of the rotor.

2. The axial gap motor according to claim 1, wherein the partition member is hollow.

3. The axial gap motor according to claim 1, wherein the partition member is formed by laminating an insulating nonmagnetic material and a non-insulating nonmagnetic material.

4. The axial gap motor according to claim 1, wherein:

the rotor includes an inner peripheral ring arranged on inner peripheral side, and an outer peripheral ring arranged on outer peripheral side; and the inner peripheral ring and the outer peripheral ring are arranged coaxially with each other, are combined together by the partition member, and sandwich the main permanent magnets and the auxiliary permanent magnets from both sides in the radial direction of the rotor.

* * * * *